(12) United States Patent
Makigaki

(10) Patent No.: US 9,143,707 B2
(45) Date of Patent: Sep. 22, 2015

(54) INTERCHANGEABLE LENS, CAMERA BODY AND CAMERA SYSTEM

(75) Inventor: Taro Makigaki, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 821 days.

(21) Appl. No.: 13/029,629

(22) Filed: Feb. 17, 2011

(65) Prior Publication Data
US 2012/0081594 A1    Apr. 5, 2012

(30) Foreign Application Priority Data
Sep. 30, 2010   (JP) .................................. 2010-221297

(51) Int. Cl.
*H04N 5/357*   (2011.01)
*H04N 5/232*   (2006.01)

(52) U.S. Cl.
CPC ......... *H04N 5/3572* (2013.01); *H04N 5/23209* (2013.01); *H04N 5/23212* (2013.01)

(58) Field of Classification Search
CPC .......... H04N 5/23209; H04N 5/23212; H04N 5/2254; H04N 5/3572; H04N 5/2253; H04N 5/225; G03B 7/20; G03B 7/14; G03B 7/18; G03B 2206/00
See application file for complete search history.

(56) References Cited

U.S. PATENT DOCUMENTS

| | | | |
|---|---|---|---|
| 5,126,780 A * | 6/1992 | Satou et al. | 396/63 |
| 5,713,053 A * | 1/1998 | Hirai | 396/92 |
| 7,787,043 B2 * | 8/2010 | Moriya | 348/335 |
| 8,054,351 B2 * | 11/2011 | Tsuda | 348/251 |
| 8,189,088 B2 * | 5/2012 | Nagata | 348/340 |
| 2008/0055458 A1 | 3/2008 | Moriya | |
| 2009/0245777 A1 | 10/2009 | Shibuno et al. | |
| 2010/0149387 A1 | 6/2010 | Tsuda | |
| 2010/0309342 A1 | 12/2010 | Nagata | |
| 2011/0007969 A1 * | 1/2011 | Park et al. | 382/167 |

FOREIGN PATENT DOCUMENTS

| | | |
|---|---|---|
| CN | 101827275 A | 9/2010 |
| JP | 2000-196953 A | 7/2000 |
| JP | A-2008-58418 | 3/2008 |

(Continued)

OTHER PUBLICATIONS

Office Action issued in Japanese Patent Application No. 2010-221297 dated Nov. 27, 2012 (with translation).

(Continued)

*Primary Examiner* — Luong T Nguyen
(74) *Attorney, Agent, or Firm* — Oliff PLC

(57) ABSTRACT

An interchangeable lens that can be fitted to and removed from a camera body, includes: an optical characteristic storage unit that stores information relating to optical characteristics of the interchangeable lens, including at least information related to vignetting of the interchangeable lens; and an optical characteristic transmission unit that transmits to the camera body the information relating to optical characteristics stored in the optical characteristic storage unit. And with an image height corresponding to one sixth of an image height from a center of an approximately rectangular photographic field to any of four corners of the photographic field being termed Y1, the optical characteristic storage unit stores, as the information related to vignetting of the interchangeable lens, information specifying vignetting at positions for which image heights from the center are integral multiples of Y1 from 2 through 6 inclusive.

11 Claims, 9 Drawing Sheets

(56) References Cited

FOREIGN PATENT DOCUMENTS

| JP | A-2009-258714 | 11/2009 |
|---|---|---|
| JP | A-2010-39759 | 2/2010 |
| JP | A-2010-41682 | 2/2010 |
| JP | A-2010-147612 | 7/2010 |
| JP | A-2010-206553 | 9/2010 |

OTHER PUBLICATIONS

May 18, 2015 Office Action issued in Chinese Application No. 201110115646.0.

* cited by examiner

| FOCAL LENGTH (mm) | 20 | 30 | 40 | 50 | ... | 200 |
|---|---|---|---|---|---|---|
| CLOSEST RANGE FOCUSED POSITION (NUMBER OF PULSES) | 9800 | 9750 | 9710 | 9680 | ... | 9150 |

| CLOSE-UP END LIMIT POSITION (NUMBER OF PULSES) | 9900 |
|---|---|
| INFINITY END LIMIT POSITION (NUMBER OF PULSES) | -100 |

FIG.6

IMAGE HEIGHT: (2/6) Y    F 4.5

| FOCAL LENGTH | PHOTOGRAPHIC DISTANCE | | | | | | | | | | | | | |
|---|---|---|---|---|---|---|---|---|---|---|---|---|---|---|
| | L1 | L2 | L3 | L4 | L5 | L6 | L7 | L8 | L9 | L10 | ... | ... | ... | Ln |
| f1 | | | | | | | | | | | | | | |
| f2 | | | | | | | | | | | | | | |
| f3 | | | | | | | | | | | | | | |
| f4 | | | | | | | | | | | | | | |
| f5 | | | | | | | | | | | | | | |
| f6 | | | | | | | | | | | | | | |
| f7 | | | | | | | | | | | | | | |
| f8 | | | | | | | | | | | | | | |
| f9 | | | | | | | | | | | | | | |
| f10 | | | | | | | | | | | | | | |
| ... | | | | | | | | | | | | | | |
| ... | | | | | | | | | | | | | | |
| ... | | | | | | | | | | | | | | |
| fn | | | | | | | | | | | | | | |

530

INTERCHANGEABLE LENS, CAMERA BODY AND CAMERA SYSTEM

INCORPORATION BY REFERENCE

The disclosure of the following priority application is herein incorporated by reference: Japanese Patent Application No. 2010-221297 filed Sep. 30, 2010.

BACKGROUND OF THE INVENTION

1. Field of the Invention

The present invention relates to an interchangeable lens, to a camera body, and to a camera system.

2. Description of Related Art

With an interchangeable lens that is used in a camera system of the interchangeable lens type, various optical characteristics, such as for example the vignetting characteristic and so on, may be different depending upon the type of the interchangeable lens. Accordingly, in order to enhance the quality of the image obtained by image capture, it is necessary to perform image processing and so on according to the optical characteristics of the interchangeable lens. Due to this, it is necessary for the camera body to acquire information related to the optical characteristics of the interchangeable lens. The camera body either obtains from the interchangeable lens information related to the optical characteristics of the interchangeable lens, or reads in information about optical characteristics corresponding to the type of the interchangeable lens from a memory in the camera body, in which information related to the optical characteristics of various interchangeable lenses of a plurality of types is stored in advance (for example, refer to Japanese Laid-Open Patent Publication 2010-41682).

SUMMARY OF THE INVENTION

For example, with the camera described in the above-identified patent document, as data related to vignetting, there are provided ten different data items respectively corresponding to ten different image heights excepting the center of the photographic field. If the number of data points for data related to the optical characteristics such as vignetting and so on is large, then a large memory capacity is required for storing this data. Conversely, if the number of data points is small, then the accuracy of image processing and so on undesirably decreases.

According to the 1st aspect of the present invention, an interchangeable lens that can be fitted to and removed from a camera body, comprises: an optical characteristic storage unit that stores information relating to optical characteristics of the interchangeable lens, including at least information related to vignetting of the interchangeable lens; and an optical characteristic transmission unit that transmits to the camera body the information relating to optical characteristics stored in the optical characteristic storage unit. And with an image height corresponding to one sixth of an image height from a center of an approximately rectangular photographic field to any of four corners of the photographic field being termed Y1, the optical characteristic storage unit stores, as the information related to vignetting of the interchangeable lens, information specifying vignetting at positions for which image heights from the center are integral multiples of Y1 from 2 through 6 inclusive.

According to the 2nd aspect of the present invention, in the interchangeable lens according to the 1st aspect, it is preferred that: the optical characteristic storage unit stores the information specifying vignetting at positions for which the image heights from the center are integral multiples of Y1 from 2 through 6 inclusive, for each of values of aperture, focal length, and photographic distance of the interchangeable lens; and the optical characteristic transmission unit transmits to the camera body information specifying vignetting at positions for which the image heights from the center are integral multiples of Y1 from 2 through 6 inclusive, corresponding to a current value of aperture, a current value of focal length, and a current value of photographic distance of the interchangeable lens.

According to the 3rd aspect of the present invention, in the interchangeable lens according to the 2nd aspect, it is preferred that: the optical characteristic storage unit stores the information specifying vignetting discretely for each of the values of aperture, focal length, and photographic distance of the interchangeable lens; and the interchangeable lens further comprises an interpolation unit that, if the information specifying vignetting corresponding to the current value of aperture, the current value of focal length, and the current value of photographic distance of the interchangeable lens is not stored in the optical characteristic storage unit, calculates the information specifying vignetting corresponding to the current value of aperture, the current value of focal length, and the current value of photographic distance of the interchangeable lens by linear interpolation based upon the information specifying vignetting stored by the optical characteristic storage unit, and the current value of aperture, the current value of focal length, and the current value of photographic distance of the interchangeable lens.

According to the 4th aspect of the present invention, in the interchangeable lens according to the 1st aspect, it is preferred that: the interchangeable lens further comprises an imaging optical system that includes a focusing lens, a lens position detection unit that detects a position of the focusing lens, and outputs a lens position signal, and a lens position signal transmission unit that transmits the lens position signal outputted from the lens position detection unit to the camera body; the lens position signal transmission unit transmits the lens position signal outputted from the lens position detection unit to the camera body via a first transmission path; and the optical characteristic transmission unit transmits information relating to optical characteristics to the camera body via a second transmission path that is different from the first transmission path.

According to the 5th aspect of the present invention, in the interchangeable lens according to the 4th aspect, it is preferred that: the interchangeable lens further comprises a transmission control unit that controls the lens position signal transmission unit and the optical characteristic transmission unit, a change detection unit that detects change of a signal level of a signal line for starting communication of the camera body, and a command data reception unit that receives predetermined data transmitted from the camera body and specifying various types of command; when the change of the signal level of the signal line for starting communication is detected by the change detection unit, the transmission control unit controls the lens position signal transmission unit so as to transmit the lens position signal outputted from the lens position detection unit to the camera body via the first transmission path; and upon receipt of predetermined data commanding transmission of the information specifying vignetting by the command data reception unit, the transmission control unit controls the optical characteristic transmission unit to transmit the information specifying vignetting to the camera body via the second transmission path.

According to the 6th aspect of the present invention, in the interchangeable lens according to the 5th aspect, it is preferred that: the command data reception unit receives the various types of commands according to an image output cycle of an image sensor provided to the camera body; and the transmission control unit transmits the information specifying vignetting to the camera body on a cycle corresponding to the image output cycle.

According to the 7th aspect of the present invention, a camera body to which can be removably fitted an interchangeable lens that holds information relating to optical characteristics including at least information related to vignetting, comprises: an exposure calculation unit that performs exposure calculation so that an adequate exposure is obtained according to a brightness of a photographic subject; an image processing unit that performs image processing upon image data obtained by image capture; and an optical characteristic information reception unit that receives from the interchangeable lens at least, as information related to vignetting of the interchangeable lens among the information relating to optical characteristics, with an image height corresponding to one sixth of an image height from a center of an approximately rectangular photographic field to any of four corners of the photographic field being termed Y1, information related to vignetting at positions for which image heights from the center are integral multiples of Y1 from 2 through 6 inclusive, And: the exposure calculation unit performs exposure calculation so as to obtain an adequate exposure according to the brightness of the photographic subject by referring to the information related to vignetting, among the information relating to optical characteristics received by the optical characteristic information reception unit, at positions where image heights from the center are even integral multiples of Y1 between 2 and 6 inclusive; and the image processing unit performs image processing on the image data by referring to the information related to vignetting, among the information relating to optical characteristics received by the optical characteristic information reception unit, at the positions where the image heights from the center are integral multiples of Y1 between 2 and 6 inclusive.

According to the 8th aspect of the present invention, in the camera body according to the 7th aspect, it is preferred that: the camera body further comprises a lens position signal reception unit that receives from the interchangeable lens a lens position signal that is a signal related to a position of a focusing lens included in the interchangeable lens; the lens position signal reception unit receives the lens position signal outputted from the interchangeable lens via a first transmission path; and the optical characteristic information reception unit receives the information relating to optical characteristics via a second transmission path that is different from the first transmission path.

According to the 9th aspect of the present invention, a camera system comprises: a camera body; and an interchangeable lens that can be fitted to and removed from the camera body. And: the interchangeable lens comprises an optical characteristic storage unit that stores information relating to optical characteristics of the interchangeable lens, including at least information related to vignetting of the interchangeable lens, and an optical characteristic transmission unit that transmits to the camera body the information relating to optical characteristics stored in the optical characteristic storage unit; with an image height corresponding to one sixth of an image height from a center of a approximately rectangular photographic field to any of four corners of the photographic field being termed Y1, the optical characteristic storage unit stores, as the information related to vignetting of the interchangeable lens, information specifying vignetting at positions for which image heights from the center are integral multiples of Y1 from 2 through 6 inclusive; the camera body comprises an exposure calculation unit that performs exposure calculation so that an adequate exposure is obtained according to a brightness of a photographic subject, an image processing unit that performs image processing upon image data obtained by image capture, and an optical characteristic information reception unit that receives from the optical characteristic transmission unit at least information related to vignetting of the interchangeable lens, among the information relating to optical characteristics; the exposure calculation unit performs exposure calculation so as to obtain an adequate exposure according to the brightness of the photographic subject by referring to the information related to vignetting, among the information relating to optical characteristics received by the optical characteristic information reception unit, at positions where image heights from the center are even integral multiples of Y1 between 2 and 6 inclusive; and the image processing unit performs image processing on the image data by referring to the information related to vignetting, among the information relating to optical characteristics received by the optical characteristic information reception unit, at the positions where the image heights from the center are integral multiples of Y1 between 2 and 6 inclusive.

According to the 10th aspect of the present invention, in the camera system according to the 9th aspect, it is preferred that: the interchangeable lens further comprises an imaging optical system that comprises a focusing lens, a lens position detection unit that detects a position of the focusing lens and outputs a lens position signal, and a lens position signal transmission unit that transmits the lens position signal outputted from the lens position detection unit to the camera body; the lens position signal transmission unit transmits the lens position signal outputted from the lens position detection unit to the camera body via a lens side first transmission path; the optical characteristic signal transmission unit transmits the information relating to optical characteristics to the camera body via a lens side second transmission path that is different from the lens side first transmission path; the camera body further comprises a lens position signal reception unit that receives the lens position signal outputted from the lens position signal transmission unit; the lens position signal reception unit receives the lens position signal outputted from the lens position signal transmission unit via a body side first transmission path; and the optical characteristic information reception unit receives the information relating to optical characteristics via a body side second transmission path that is different from the body side first transmission path.

BRIEF DESCRIPTION OF THE DRAWINGS

FIG. 6 is a figure showing information related to vignetting, stored in the ROM 215;

DESCRIPTION OF THE PREFERRED EMBODIMENTS

Figure 1:
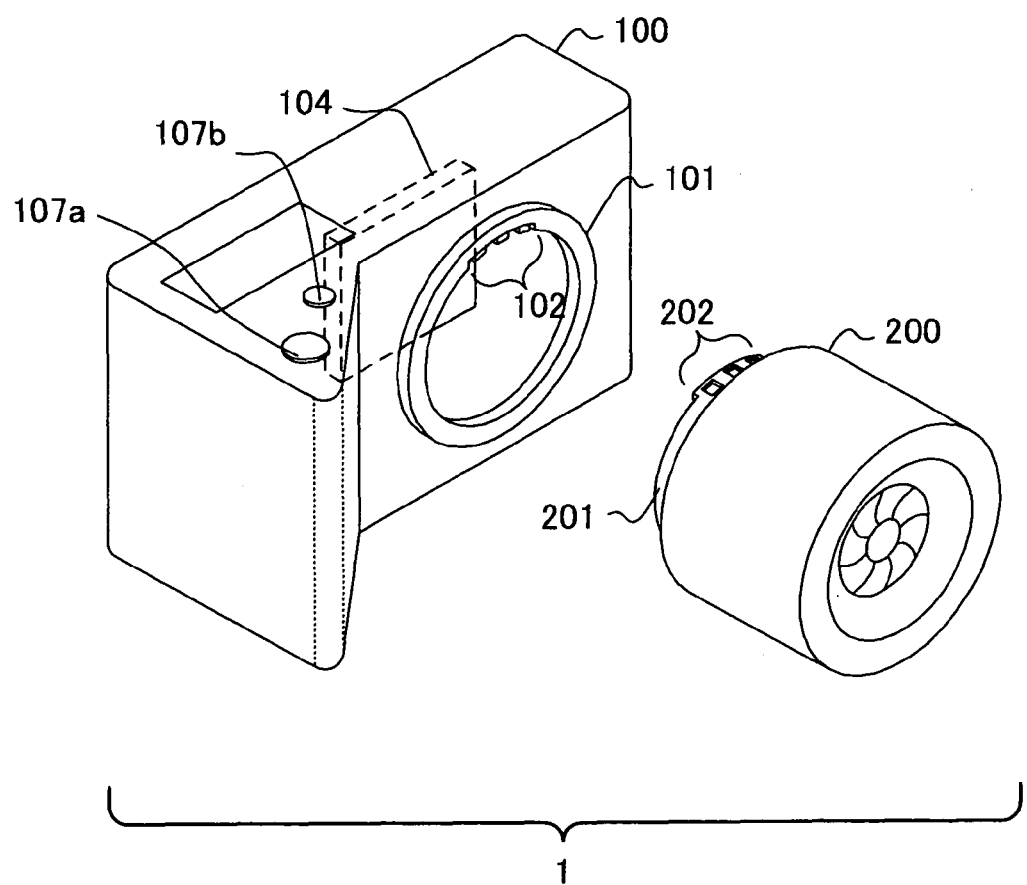
FIG. 1 is a perspective view showing an interchangeable lens type camera system to which the present invention is applied.

An embodiment of the interchangeable lens, the camera body, and the camera system according to the present invention will now be explained with reference to FIGS. 1 through 9. FIG. 1 is a perspective view showing an interchangeable lens type camera system to which the present invention is applied. It should be understood that, in FIG. 1, only devices and mechanisms related to the present invention are shown; other devices and mechanisms will neither be shown nor explained. This camera 1 includes a camera body 100 and a lens barrel 200 (an interchangeable lens) that can be fitted to the camera body 100 and removed therefrom. The lens barrel 200 is a so called zoom lens whose focal length can be changed by actuation of a zoom ring not shown in the figures.

A lens mount 101 is provided to the camera body 100, and is adapted for the lens barrel 200 to be fitted to this lens mount 100. Moreover, a lens mount 201 is provided to the lens barrel 200 and corresponds to the body side lens mount 101, so that the lens barrel 200 can be fitted to the camera body 100 and removed therefrom. When the lens barrel 200 is installed, a connection section 102 that is provided upon the body side lens mount 101 and that includes a plurality of contact points comes into contact with and is connected to a connection section 202 that is provided upon the lens side lens mount 201 and that similarly includes a plurality of contact points. The connection sections 102 and 202 are utilized for providing supply of electrical power from the camera body 100 to the lens barrel 200, and for transmission and reception of signals between the camera body 100 and the lens barrel 200.

An image sensor 104 is provided behind the lens mount 101, within the camera body 100. And buttons 107a and 107b, that constitute input devices, are provided on the upper portion of the camera body 100. Using these buttons 17a and 17, the user is able to issue commands for photography to the camera body 100, and to set photographic conditions and so on.

Figure 2:
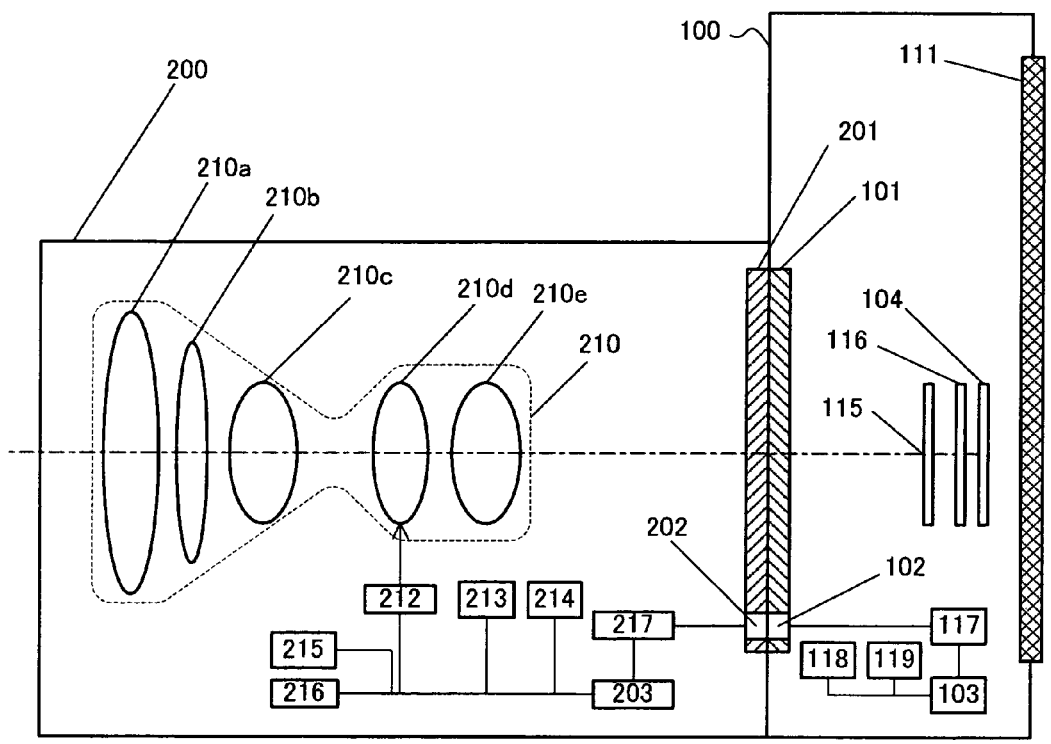
FIG. 2 is a sectional view showing this interchangeable lens type camera system.

FIG. 2 is a sectional view showing this interchangeable lens type camera system to which the present invention is applied. The lens barrel 200 includes an imaging optical system 210 that forms an image of the photographic subject. And this imaging optical system 210 includes a plurality of lenses 210a through 210e. Among this plurality of lenses 210a through 210e, a focusing lens 210d is provided for controlling the position along the optical axis at which the image of the photographic subject is focused. The imaging optical system 210 is configured so that its focal length can be varied, according to rotation of a zoom ring not shown in the figures.

A lens side control unit 203 that supervises control of the various sections of the lens barrel 200 is provided internally to the lens barrel 200. This lens side control unit 203 includes a microcomputer and peripheral circuitry and so on thereof, not shown in the figures. A lens side transmission and reception unit 217, a lens drive unit 212, a lens position detection unit 213, a focal length detection unit 214, a ROM 215, and a RAM 216 are connected to the lens side control unit 203.

The lens side transmission and reception unit 217 can transmit and receive signals to and from the camera body 100 via the connection sections 102 and 202. The lens drive unit 212 includes an actuator such as, for example, a stepping motor or the like, and this actuator drives the focusing lens 210d within a range that will be described hereinafter, according to a signal inputted from the lens drive unit 212. The lens position detection unit 213 detects the position of the focusing lens 210d by, for example, counting the number of pulses of the signal inputted to the stepping motor incorporated in the lens drive unit 212, and outputs a lens position signal. Or it would also be acceptable to detect the position of the focusing lens 210d by using a per se known type of distance encoder or the like, provided to the lens barrel 200. And the focal length detection unit 214 detects the focal length of the imaging optical system 210 using, for example, a zoom encoder or the like, and outputs a focal length signal.

The ROM 215 is a non-volatile storage medium, and stores in advance a predetermined control program that is executed by the lens side control unit 203, and also a position information table and vignetting information tables and so on that will be described hereinafter. And the RAM 216 is a volatile storage medium, and is utilized by the lens side control unit 203 as a storage region for various types of data.

A shutter 115 and a filter 116 are provided in front of the image sensor 104. Light from the photographic subject that has passed through the imaging optical system 210 is incident upon the image sensor 104 via the shutter 115 and the filter 116. The shutter 115 controls the state of exposure of the image sensor 104. And the filter 116 is an optical filter consisting of a combination of an optical low pass filter and an infra-red radiation cutoff filter.

A body side control unit 103 that provides supervisory control of the various sections of the camera body 100 is provided internally to the camera body 100. This body side control unit 103 includes a microcomputer and peripheral circuitry and so on thereof, not shown in the figures. A body side transmission and reception unit 117, a ROM 118, and a RAM 119 are connected to the body side control unit 103. This body side transmission and reception unit 117 is connected to the connection section 102, and is capable of transmitting and receiving signals to and from the lens side transmission and reception unit 217 via this connection section 102.

The ROM 118 is a non-volatile storage medium, and stores in advance a predetermined control program that is executed by the body side control unit 103. And the RAM 119 is a volatile storage medium, and is utilized by the body side control unit 103 as a storage region for various types of data.

A display device 111 that consists of an LCD panel or the like is mounted on the rear surface of the camera body 100. And the body side control unit 103 displays an image of the photographic subject based upon the output of the image sensor 104 (a so called through image or live view image) upon this display device 111, and also displays menu screens of various types for setting photographic conditions and so on.

<Explanation of the Automatic Focus Adjustment>

The body side control unit 103 is adapted to perform automatic focus adjustment processing of a per se known type. This automatic focus adjustment processing includes focus detection processing in which the current focus adjustment state is detected, and focus adjustment processing in which the focusing lens 210d is driven according to the result of this detection so as to perform focus adjustment. The body side control unit 103 is adapted to be able to perform either of two different types of focus detection processing in this automatic focus adjustment processing. In concrete terms, the body side control unit 103 can perform either focus detection processing using a so called photographic image surface phase difference detection method, or focus detection processing according to a so called contrast detection method. The body side control unit 103 uses one or the other of these two types of focus detection processing, according to the conditions of photography and the characteristics of the photographic subject and so on.

Now the focus detection processing performed by the body side control unit 103 according to the photographic image surface phase difference detection method will be explained. The image sensor 104 of this embodiment has specific pixels for focus detection. These pixels for focus detection are similar to those described in Japanese Laid-Open Patent Publication 2007-317951. And the body side control unit 103 performs focus detection processing by performing per se known phase difference detection using the pixel output data from these pixels for focus detection. It should be understood that, since this calculation for phase difference detection is similar to that described in, for example, Japanese Laid-Open Patent Publication 2007-317951, accordingly description thereof will here be omitted. The body side control unit 103 performs automatic focus adjustment by driving the focusing lens 210d on the basis of a defocus amount that is obtained by this focus detection processing.

And now the focus detection processing performed by the body side control unit 103 according to the contrast detection method will be explained. The body side control unit 103 calculates a focus evaluation value (i.e. a contrast value) by performing a per se known type of contrast detection calculation based upon a so called hill climbing method (scanning and contrast detecting method), using the pixel output data from the image capture pixels included in the image sensor 104. And the body side control unit 103 performs this contrast detection calculation while driving the focusing lens 210d over a range that will be described hereinafter, and performs automatic focus adjustment by detecting the position at which this focus evaluation value reaches its peak.

<Explanation of the Data Communication

Figure 3:
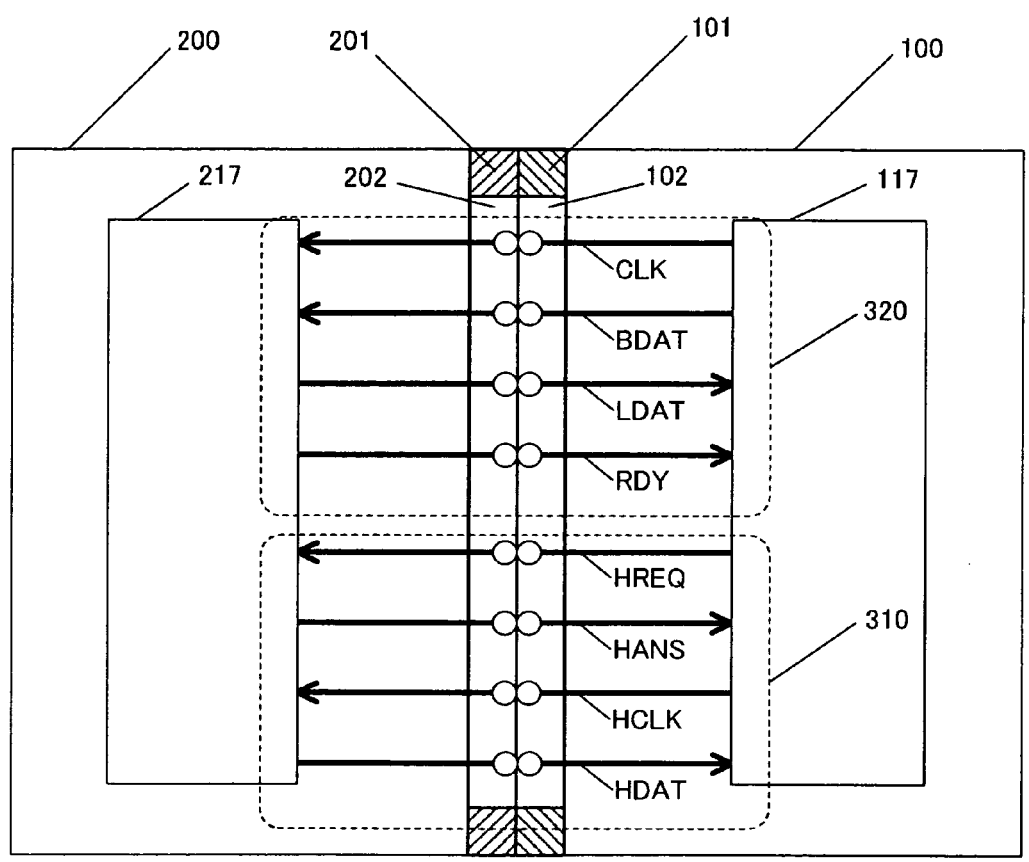
FIG. 3 is a schematic figure showing the details of connection sections 102 and 202.

FIG. 3 is a schematic figure showing the details of the connection sections 102 and 202. As shown in FIG. 3, each of the connection sections 102 and 202 has eight contact points for performing signal transmission and reception. In other words, eight signal lines are present between the camera body 100 and the lens barrel 200, each corresponding to a pair of contact points. It should be understood that, apart from these contact points, there may also be provided a plurality of contact points for performing power supply from the camera body 100 to the lens barrel 200 and so on, but these are not shown in the figure and explanation thereof will be omitted. In the following, as shown in FIG. 3, these eight signal lines will be termed HCLK, HREQ, HANS, HDAT, CLK, RDY, BDAT, and LDAT.

Of the eight signal lines described above, the signal lines HCLK, HREQ, HANS, and HDAT constitute a first transmission path 310. In a similar manner, the signal lines CLK, RDY, BDAT, and LDAT constitute a second transmission path 320. In the following, these two transmission paths will be explained.

The first transmission path 310 is used by the lens side transmission and reception unit 217 for transmitting the lens position signal that specifies the position of the focusing lens 210d to the camera body 100. And the body side transmission and reception unit 117 changes the signal level of HREQ on a predetermined cycle (whose period may be, for example, one millisecond). The lens side control unit 203 starts processing to prepare for communication according to this change of the signal level of HREQ. In concrete terms, this communication preparation processing is processing for detection of the position of the focusing lens 210d using the lens position detection unit 213, and processing for outputting a lens position signal and transmitting it to the camera body 100.

When the communication preparation processing is completed, the lens side transmission and reception unit 217 changes the signal level of HANS. In response to this change of the signal level of HANS, the body side transmission and reception unit 117 outputs a clock signal to HCLK. And the lens side transmission and reception unit 217 outputs the lens position data to HDAT in synchrony with this clock signal.

The second transmission path 320 is used for transmission of control commands, and for transmission of data of various types from the lens barrel 200 to the camera body 100. This second transmission path is a full duplex transmission path. In other words, it can be used for performing transmission of data from the camera body 100 to the lens barrel 200, simultaneously with being used for performing transmission of data from the lens barrel 200 to the camera body 100.

When a requirement arises to perform communication using this second transmission path 320, the body side transmission and reception unit 117 is controlled to output a clock signal to CLK. For example, in order for lens information to be acquired for each photographic frame during photographic operation, the body side transmission and reception unit 117 outputs a clock signal for synchronization to the image capture cycle of the image sensor (for example, if the image sensor captures images at 60 fps, then the clock signal is outputted on a cycle of period approximately 16 msec). At this time, the body side transmission and reception unit 117 outputs the data that is to be the subject of transmission to BDAT in synchrony with this clock signal. On the other side, the lens side transmission and reception unit 217 outputs data that is to be the subject of transmission to LDAT, also in synchrony with this clock signal. It should be understood that the lens side transmission and reception unit 217 changes the signal level of RDY in one direction if it is possible to transmit and receive data, and in the other direction if it is not possible to do so. For example, if the lens side transmission and reception unit 217 is in a state in which it cannot transmit or receive data, then it may bring the signal level of RDY to H, while if it is in a state in which it can transmit or receive data, then it may bring the signal level of RDY to L. The body side transmission and reception unit 117 checks the signal level of RDY before starting communication, and does not perform communication if the lens side transmission and reception unit 217 is in a state in which it cannot transmit or receive data.

The body side transmission and reception unit 117 uses the second transmission path 320 explained above for transmitting various types of control signals to the lens barrel 200. Examples of such control signals are a control signal for shifting the focusing lens 210d in the infinity direction by a specified number of pulses (for example by ten pulses), a control signal for closing the aperture (not shown in the figures) by a specified number of steps (for example by two steps), and so on.

Apart from the data that the body side transmission and reception unit 117 transmits using the second transmission path 320, there are also request signals in which various types of information are requested from the lens barrel 200. Examples of such request signals are, for example, a request signal that requests a signal (data) specifying the current focal length of the imaging optical system 210, a request signal that requests a signal (data) specifying the current aperture value of the aperture (not shown in the figures), a request signal that requests a signal (data) specifying information related to the optical characteristics of the imaging optical system 210, and so on. When the lens side transmission and reception unit 217 receives the request signal described above, it transmits corresponding data to the body side transmission and reception unit 117 via the second transmission path 320.

It should be understood that the time period that is required for the body side transmission and reception unit 117 to receive any signal from the lens side transmission and reception unit 217 using the second transmission path 320 described above is relatively long, as compared to the time period that is required for a lens position signal to be received using the first transmission path 310. This is because, on the second transmission path 320, it is first necessary for a request for specific information to be transmitted to the lens side transmission and reception unit 217 using CLK and BDAT, as opposed to the case with the first transmission path 310, for which the request to the lens side transmission and reception unit 217 for data is transmitted only by changing the signal level of HREQ. Accordingly, the lens side transmission and reception unit 217 is able to transmit a lens position signal repeatedly at a higher frequency than the frequency of transmitting a close range focus position.

<Explanation of the Drive Range of the Lens Drive Unit 212>

Figure 4:
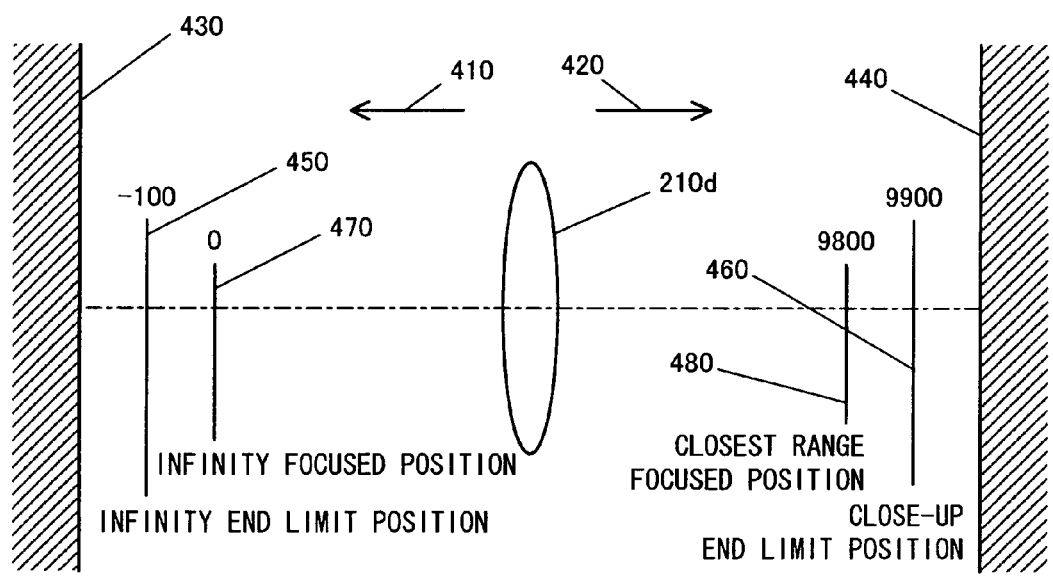
FIG. 4 is a schematic figure showing the drive range of a focusing lens 210d.

FIG. 4 is a schematic figure showing the range through which the focusing lens 210*d* is driven. The focusing lens 210*d* is adapted to be shiftable along the optical axis 400 (shown in FIG. 4 by a single dotted broken line) in the infinity direction 410 and in the close-up direction 420. Stoppers not shown in the figures are provided at the end 430 in the infinity direction 410 and at the end 440 in the close-up direction 420, and these limit the shifting of the focusing lens 210*d*. In other words, the focusing lens 210*d* is adapted to be shiftable between the end 430 in the infinity direction 410 and the end 440 in the close-up direction 420.

However, the range over which the lens drive unit 212 actually shifts the focusing lens 210*d* is smaller than the above described range from the end 430 to the end 440. To describe this shift range in concrete terms, the lens drive unit 212 can drive the focusing lens 210*d* from an infinity end limit position 450 that is provided somewhat inward from the end 430 in the infinity direction 410 to a close-up end limit position 460 that is provided somewhat inward from the end 440 in the close-up direction 420. In other words, the lens drive unit 212 drives the focusing lens 210*d* between the close-up end limit position 460 that corresponds to the position of its drive limit on the close-up side, and the infinity end limit position 450 that corresponds to the position of its drive limit on the infinity side.

The infinity end position 450 is provided further out than the position 470 at which the focusing lens 210*d* is focused at infinity. It should be understood that this infinity focused position 470 is the position of the focusing lens 210*d* when it is focused upon a photographic subject at infinity, in other words is the position of the focusing lens 210*d* that corresponds to the position furthest towards the infinity side at which the imaging optical system 210 can be focused. The reason for providing the infinity end limit position at a position like this is because, if automatic focus adjustment is performed by a so called hill climbing method, then sometimes it is the case that the peak of the focus evaluation value is located at the infinity focused position 470. If the infinity focused position 470 were to coincide with the infinity end limit position 450, then the problem could arise of it becoming impossible to recognize a peak of the focus evaluation value that was located at the infinity focused position 470 as being a peak, and this would be undesirable. In a similar manner, the close-up end limit position 460 is provided further out than the position 480 at which the focusing lens 210*d* is focused at its closest range. This closest range focused position 480 is the position of the focusing lens 210*d* when it is focused upon a photographic subject at the closest possible range, in other words is the position of the focusing lens 210*d* that corresponds to the position furthest towards the close-range side at which the imaging optical system 210 can be focused.

In this embodiment, the position of the focusing lens 210*d* is given by the number of pulses of the signal supplied to the lens drive unit 212. Furthermore, the number of pulses takes the infinity focused position 470 as origin (i.e. as reference). For example, as shown in FIG. 4, the infinity end limit position 450 may be the position at −100 pulses, the closest range focused position 480 may be the position at 9,800 pulses, and the close-up end limit position 460 may be the position at 9,900 pulses. In this case a signal of 10,000 pulses should be supplied to the lens drive unit 212, in order to shift the focusing lens 210*d* from the infinity end limit position 450 to the close-up end limit position 460.

It should be understood that, of course, it would also be acceptable for the infinity end limit position 450, the close-up end limit position 460, and the closest range focused position 480 to correspond to pulse numbers different from those above; and, moreover, it would also be acceptable for them to be different according to the classification of the lens, or individually.

<Explanation of the Position Information Table>

During automatic focus adjustment, for example, it is necessary for the body side control unit 103 to be aware of the infinity end limit position 450, the close-up end limit position 460, and the infinity focused position 470 described above. However, as previously described, the focal length of the imaging optical system 210 is variable, and the closest range focused position 480 varies according to the focal length.

Thus, in this embodiment, the closest range focused positions 480 corresponding to each focal length are stored in advance in the ROM 215 in the form of a position information table, and periodically the closest range focused position 480 corresponding to the current focal length is transmitted from the lens side transmission and reception unit 217 to the body side transmission and reception unit 117 via the second transmission path.

Figure 5A:
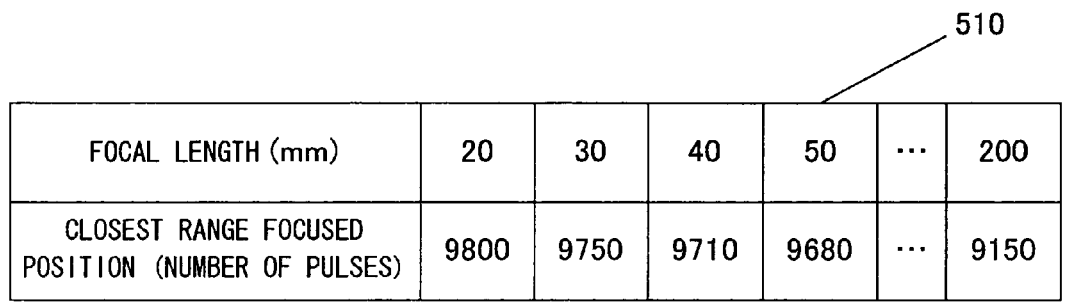
FIGS. 5A and 5B are figures showing position information stored in a ROM 215.
Figure 5B:
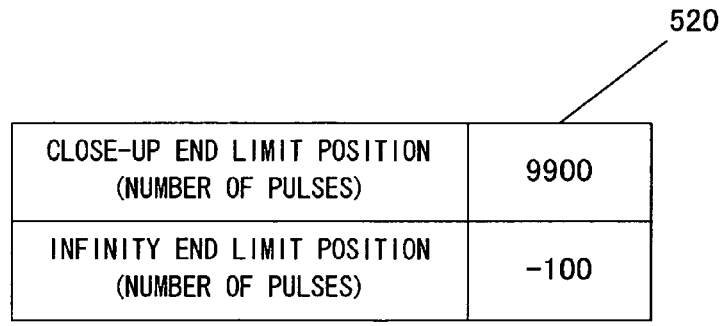

FIGS. 5A and 5B are figures showing the positional information stored in the ROM 215. The position information table 510 shown in FIG. 5A is stored in advance in the ROM 215. This position information table 510 is a table giving closest range focused positions in correlation with the focal length of the imaging optical system 210. According to this position information table 510 shown in FIG. 5A, for example, when the focal length of the imaging optical system 210 is 20 mm, the closest range focused position is the position at 9,800 pulses. Furthermore, when the focal length of the imaging optical system 210 is 30 mm, the closest range focused position is the position at 9,750 pulses.

According to change of the focal length of the imaging optical system 210, using the focal length signal outputted from the focal length detection unit 214, the lens side control unit 203 acquires the closest range focused position that corresponds to the current focal length from the position information table 510, and stores it in the RAM 216. And, when the lens side transmission and reception unit 217 receives a request signal for the closest range focused position from the camera body 100 via the second transmission path 320, in response thereto, it controls the lens side transmission and reception unit, and transmits the closest range focused position stored in the RAM 216 to the body side transmission and reception unit 117.

Furthermore, a limit position information table 520 is stored in the ROM 215, as shown in FIG. 5B. This limit position information table 520 is a table that includes the close-up end limit position 460 and the infinity end limit position 450.

When storing the closest range focused position in the RAM 216, the lens side control unit 203 stores the close-up end limit position 460 and the infinity end limit position 450 included in the above described limit position information table 520 in association therewith. And, when the lens side transmission and reception unit 217 receives a request signal from the camera body 100, it controls the lens side transmission and reception unit 217 so as to transmit these three items of information stored in the RAM 216 to the body side transmission and reception unit 117 in association with one another. And on the basis of these items of information received by the body side transmission and reception unit 117, the body side control unit 103 performs determination of the number of pulses for shifting the focusing lens 210d to the target position, and performs determination of a scan range for the focusing lens 210d during focus detection processing by the contrast method.

It should be understood that the position information table 510 need not include closest range focused positions corresponding to all of the focal lengths to which the imaging optical system 210 can be set. If the focal length is set to an actual focal length that is not included in the position information table 510, then the lens side control unit 203 calculates the closest range focused position that corresponds to this actual focal length by an interpolation calculation from the closest range focused positions corresponding to the closest focal lengths in the position information table 510 that are above and below that actual focal length.

<The Optical Characteristics of the Imaging Optical System 210>

According to the optical characteristics of the imaging optical system 210, for example, sometimes its transmittivity may vary according to the wavelength of the light from the photographic subject, or distortion or vignetting (peripheral darkening) or chromatic aberration of magnification or the like may occur. Moreover, the optical characteristics of the imaging optical system 210 vary according to the type of the lens barrel 200. Thus, in this embodiment, information related to the optical characteristics of the imaging optical system 210 is transmitted from the lens barrel 200 to the camera body 100. And various types of correction processing are performed by the camera body 100 on the basis of this information that has been received. In concrete terms, the following processes are performed.

Figure 7:
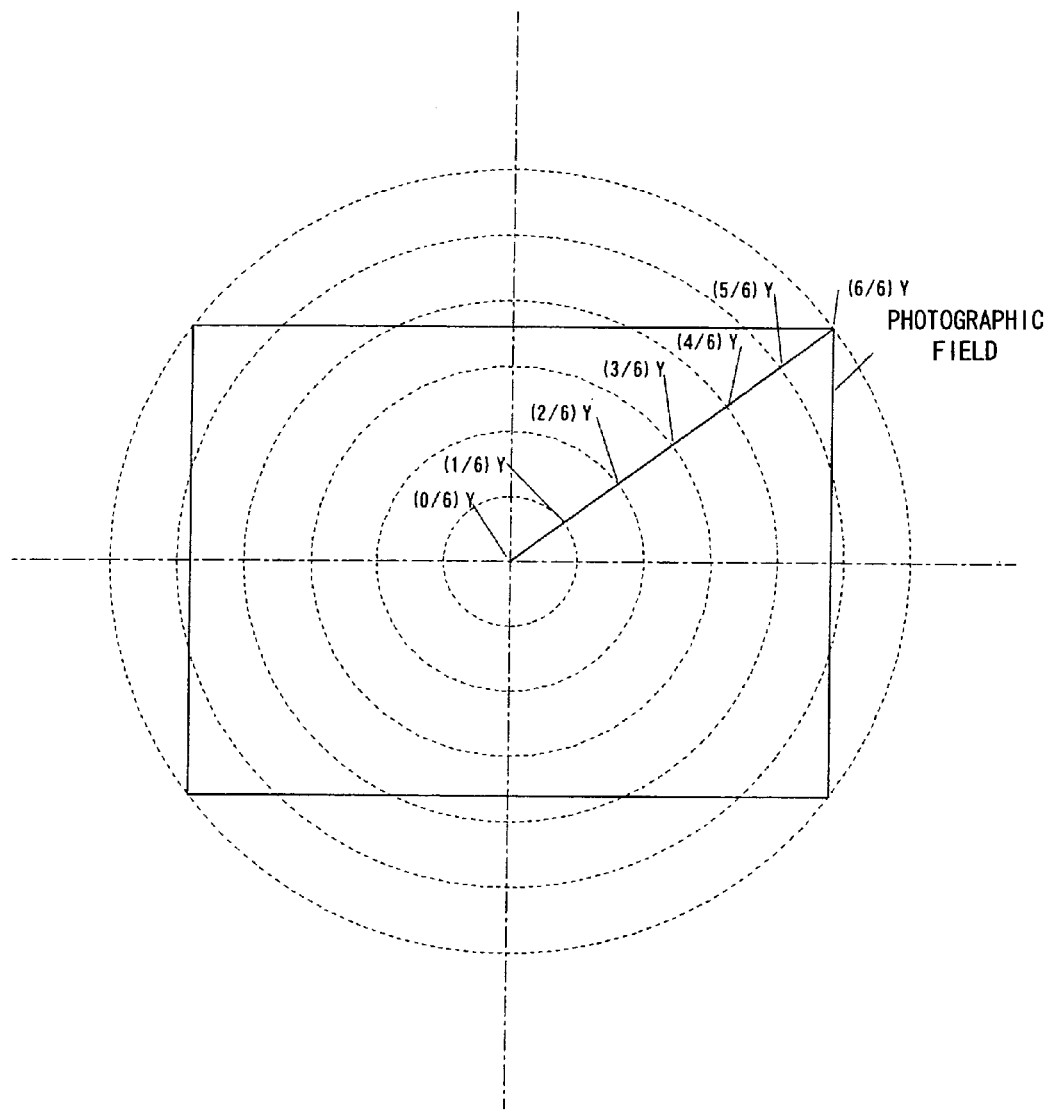
FIG. 7 is a figure for explanation of image height in relation to information related to vignetting, stored in the ROM 215.

Information related to the optical characteristics of the imaging optical system 210 is stored in advance in the ROM 215. Now an explanation will be provided of information related to vignetting, and information related to chromatic aberration of magnification, these being examples of such information related to the optical characteristics of the imaging optical system 210 stored in the ROM 215. FIG. 6 is a figure showing an example of a vignetting information table, and this is information related to vignetting that is stored in the ROM 215. The vignetting information table 530 shown in FIG. 6 is one that shows the degree of vignetting when the aperture value is F4.5, and when the image height (distance) from the center of the photographic field is (2/6)Y, with Y denoting the image height from the center of the photographic field (that is approximately rectangular) (i.e. from the optical axis, that is the center of the ray bundle from the photographic subject) to any one of the four corners of that photographic field, as shown in FIG. 7.

As well as varying according to the image height and the aperture value, the degree of vignetting also varies according to the focal length and the focal position (i.e., the photographic distance). Thus, in this embodiment, as shown in the vignetting information table 530 of FIG. 6, for each of a range of image heights and for each of a range of aperture values, information about vignetting is stored in the ROM 215 as data in the form of a matrix whose parameters are the focal length and the photographic distance. It should be understood that while, in the vignetting information table 530 shown in FIG. 6, for the convenience of display in the figure, each square is shown as an empty field, actually a value (hereinafter termed the vignetting value) is inputted into each of the fields, giving the amount of light in the circumstances specified by the parameters of that field, when the amount of light at the center of the photographic field (in other words, where the image height is zero) is taken as being unity (1).

For each of a plurality of aperture values (for example, for six aperture values), a vignetting information table 530 is stored in the ROM 215 for each of five image heights: (2/6)Y, (3/6)Y, (4/6)Y, (5/6)Y, and (6/6)Y. The reasons for storing vignetting information tables 530 in the ROM 215 for five image heights at the pitch of (1/6)Y from (2/6)Y to (6/6)Y (in other words, for the number of vignetting information tables 530 for each individual aperture value to be five) are as follows.

(1) If the number of vignetting information tables 530 for a single aperture value were to be six or more, then, while it would be possible to enhance the accuracy of the correction processing for vignetting performed in the camera body 100 that will be described hereinafter, the storage capacity in the ROM 215 that would be required would become undesirably great. Moreover, the burden of communication with the camera body 100 would also become great.

(2) Conversely, if the number of vignetting information tables 530 for a single aperture value were to be four or fewer, then, while it would be possible to reduce the storage capacity required for the ROM 215 and to reduce the burden of communication with the camera body, it would be difficult to enhance the accuracy of the correction processing for vignetting performed in the camera body 100 (in particular, of the correction processing for images obtained by image capture).

(3) By setting the pitch of the image height for which the vignetting information table 530 is provided to the constant pitch of (1/6)Y, it is possible to simplify the calculation when obtaining the vignetting for an intermediate image height for which no such vignetting information table 530 is provided by linear interpolation, as will be described hereinafter.

(4) Since it is unlikely that vignetting will occur in the neighborhood of the center of the photographic field, there is little necessity for providing any vignetting information table 530 for that region. Due to this, it is possible to set the pitch between the image heights for which vignetting information tables 530 are provided to the constant pitch of (1/6)Y, and it is also possible to omit any vignetting information table 530 for the relatively small image height of (1/6)Y.

(5) As will be described hereinafter, in exposure calculation during photography, it is possible to perform correction processing for obtaining an adequate exposure value if values of vignetting are obtained for three image heights, namely (1/3)Y [in other words (2/6)Y], (2/3)Y [in other words (4/6)Y], and (3/3)Y [in other words (6/6)Y]. However, if the number of vignetting information tables 530 that are provided as described above for one aperture value is set to only three, then it becomes difficult to improve the accuracy of subsequent correction processing of the image obtained by image capture by the camera body 100 for correction of vignetting. Thus, it is arranged further to provide a vignetting information table 530 at the position intermediate between (1/3)Y and (2/3)Y, in other words at the position (3/6)Y, and also to provide a vignetting information table 530 at the position intermediate between (2/3)Y and (3/3)Y, in other words at the position (5/6)Y.

Figure 8:
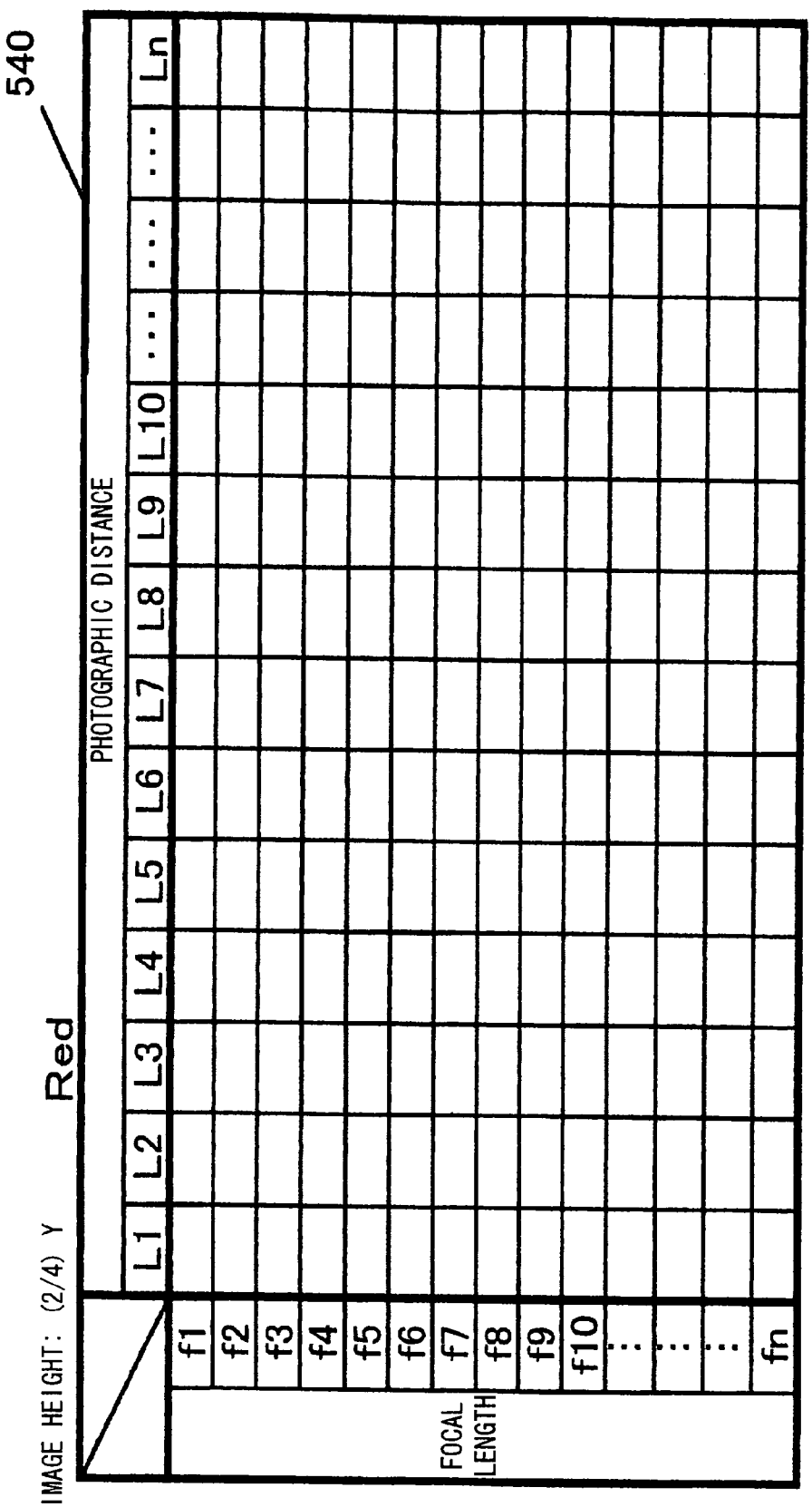
FIG. 8 is a figure showing information related to chromatic aberration of magnification, stored in the ROM 215.
Figure 9:
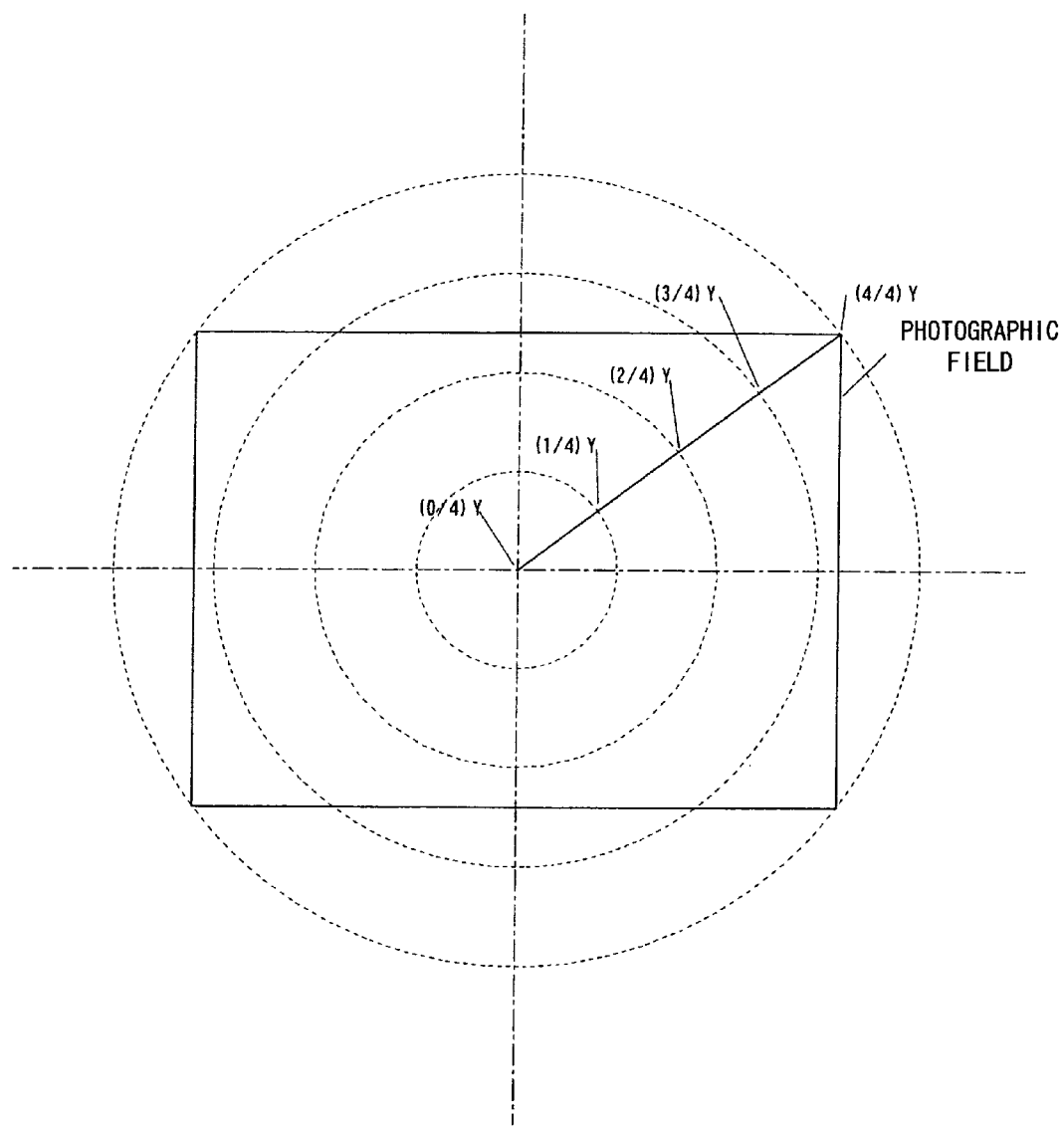
FIG. 9 is a figure for explanation of image height in relation to information related to chromatic aberration of magnification, stored in the ROM 215.

FIG. 8 is a figure showing an example of a chromatic aberration of magnification information table stored in the ROM 215, this being information related to chromatic aberration of magnification. This chromatic aberration of magnification information table 540 shown in FIG. 8 is a table giving the chromatic aberration of magnification of red colored light for an image height from the center of the photographic field of (2/4)Y, with Y denoting the image height from the center of the photographic field (that is approximately rectangular) (i.e. from the optical axis, that is the center of the ray bundle from the photographic subject) to any one of the four corners of that rectangular photographic field, as shown in FIG. 9.

As well as varying according to the wavelength of the light in question and according to the image height, the chromatic aberration of magnification also varies according to the focal length and the photographic distance. Thus, in this embodiment, as shown in the chromatic aberration of magnification information table 540 of FIG. 8, for each of a range of colors (wavelengths) and for each of a range of image heights, information about the chromatic aberration of magnification is stored in the ROM 215 as data in the form of a matrix whose parameters are the focal length and the photographic distance. It should be understood that while, in the chromatic aberration of magnification information table 540 shown in FIG. 8, for the convenience of display in the figure, each square is shown as an empty field, actually the aberration when green colored light is taken as a reference is inputted into each of the fields.

A chromatic aberration of magnification information table 540 is stored in the ROM 215 for each of red colored light and blue colored light, and for each of three image heights: (2/4)Y, (3/4)Y, and (4/4)Y.

<Transmission of the Information Related to the Optical Characteristics of the Imaging Optical System 210>

As described above, when a request signal that requests a signal specifying information related to the optical characteristics of the imaging optical system 210 is received via the second transmission path 320, the lens side control unit 203 gathers together the requested information related to the optical characteristics of the imaging optical system from various sections. And the lens side control unit 203 transmits this information that it has gathered to the camera body 100 via the second transmission path 320. Moreover, the lens side control unit 203 gathers information related to vignetting in the manner that will now be described, and transmits it to the camera body 100 via the second transmission path 320.

Upon receipt of a request signal that request a signal specifying information related to vignetting via the second transmission path 320, the lens side control unit 203 calculates the current photographic distance and the current focal length of the imaging optical system 210 on the basis of the lens position signal and the focal length signal outputted from the lens position detection unit 213 and the focal length detection unit 214. Furthermore, upon receipt of the request signal that requests the signal specifying information related to vignetting via the second transmission path 320, the lens side control unit 203 calculates the current aperture value of the iris aperture not shown in the figures on the basis of a signal giving the current aperture value of the iris aperture from an aperture value detection unit not shown in the figures.

And, from the five vignetting information tables 530 relating to the image heights (2/6)Y to (6/6)Y, among the plurality of vignetting information tables 530, that correspond to the current aperture value that has thus been calculated, the lens side control unit 203 acquires each of the values of vignetting for the current photographic distance and the current focal length that have been calculated. It should be understood that, if the current photographic distance or the current focal length that has been calculated does not agree with any exact photographic distance or focal length parameter of the vignetting information tables 530, then the lens side control unit 203 acquires the values for vignetting for the current photographic distance and the current focal length by performing appropriate linear interpolation while referring to the vignetting information tables 530.

Then the lens side control unit 203 controls the lens side transmission and reception unit 217 so as to transmit the values of vignetting that it has acquired via the second transmission path. Due to this, the information related to vignetting is transmitted to the camera body 100.

For example, if the current values of aperture, photographic distance, and focal length that have been calculated are respectively F4.5, L4, and f7, then the lens side control unit 203 reads in and acquires the value of vignetting that corresponds to the photographic distance L4 and the focal length f7 from the vignetting information table 530 shown in FIG. 6 that gives the degree of vignetting for the aperture value of F4.5 at an image height from the center of the photographic field of (2/6)Y. In a similar manner, the lens side control unit 203 reads in and acquires the values of vignetting that correspond to the photographic distance L4 and the focal length f7 from the vignetting information tables 530 that give the degrees of vignetting for the aperture value of F4.5 at image heights from the center of the photographic field of (3/6)Y, (4/6)Y, (5/6)Y, and (6/6)Y Thereafter, the lens side control unit 203 controls the lens side transmission and reception unit 217 so as to transmit, via the second transmission path 320, the five values for vignetting at the image heights from the center of the photographic field of (2/6)Y, (3/6)Y, (4/6)Y, (5/6)Y, and (6/6)Y that have thus been acquired.

It should be understood that, for transmission of the information related to the chromatic aberration of magnification as well, the same procedure is followed as for the transmission of the information related to vignetting described above.

<Correction Processing Based Upon the Information Related to the Optical Characteristics of the Imaging Optical System 210>

Upon receipt by the body side transmission and reception unit 117, via the second transmission path 320, of the five values for vignetting at the image heights of (2/6)Y, (3/6)Y, (4/6)Y, (5/6)Y, and (6/6)Y described above, the body side control unit 103 stores these values for vignetting that have been received in the RAM 119. It should be understood that, since these values for vignetting are repeatedly transmitted periodically from the lens barrel 200, accordingly, each time values for vignetting are received, the body side control unit 103 overwrites the values for vignetting that are already stored in the RAM 119 with the values for vignetting that have newly been received. The same holds for the information related to the chromatic aberration of magnification.

For exposure calculation during photography, among the values for vignetting that are stored in the RAM 119, the body side control unit 103 refers to the three values for vignetting for the three image heights (2/6)Y, (4/6)Y, and (6/6)Y, and performs correction processing in order to obtain an appropriate exposure value. In other words, for exposure calculation during photography, when performing exposure calculation on the basis of the pixel output data from the pixels for image capture included in the image sensor 104, the body side control unit 103 calculates the exposure value by reference to the values of vignetting for the above described three image heights.

Moreover, the body side control unit refers to the five values for vignetting for the five image heights (2/6)Y, (3/6)Y, (4/6)Y, (5/6)Y, and (6/6)Y, and performs correction processing upon the image that has been obtained by image capture. In other words, after having captured an image, the body side control unit 103 refers to the five values of vignetting for the five image heights described above, and performs image processing so as to deduct the influence of vignetting upon the image that has been obtained by image capture. In concrete terms, the body side control unit 103 refers to the five amounts of vignetting for the five image heights (2/6)Y, (3/6)Y, (4/6)Y, (5/6)Y, and (6/6)Y stored in the RAM 119, and calculates the gains necessary for vignetting correction at these image heights. And the body side control unit 103 performs image processing so as to suppress the influence of vignetting upon the image that has been obtained by image capture while referring to these gains that it has calculated. It should be understood that, since the values of vignetting stored in the RAM 119 are values distributed over five different image heights, accordingly, by performing appropriate linear interpolation, the body side control unit 103 is able to calculate the gain required for vignetting correction for any desired image height from 0 to Y.

The body side control unit 103 then performs correction processing upon the image that it has acquired by image capture, while referring to the three values for chromatic aberration of magnification stored in the RAM 119 for the three image heights (2/4)Y, (3/4)Y, and (4/4)Y. In other words, after an image has been captured, the body side control unit 103 refers to the above described information relating to chromatic aberration of magnification for these three image heights, and performs image processing so as to suppress the influence of chromatic aberration of magnification upon the image that has been obtained by image capture.

The camera system according to the first embodiment of the present invention described above provides the following beneficial operational effects.

(1) It is arranged to store the vignetting (peripheral darkening) information tables 530 for the five image heights (2/6)Y, (3/6)Y, (4/6)Y, (5/6)Y, and (6/6)Y in the ROM 215 as the information related to vignetting. Due to this, it is possible to keep down the storage capacity required in the ROM 215, and it is possible to provide sufficient information to ensure the accuracy of vignetting correction processing by the camera body 100.

(2) The pitch of the image heights at which the vignetting information tables 530 are provided is the constant pitch of (1/6)Y. Due to this, as described above, by performing appropriate linear interpolation while referring to the vignetting information tables 530, it is possible to reduce the burden of calculation upon the lens side control unit 203 during acquisition of a value of vignetting for the current photographic distance and the current focal length.

(3) Corresponding to the current values of aperture, photographic distance, and focal length, it is arranged to transmit only the five values of vignetting for the five image heights to the camera body 100. Due to this, it is possible to keep down the amount of data to be transmitted, since it is possible to transmit to the camera body 100 only that information related to vignetting that is actually required. Accordingly it is possible to reduce the load required for communication, and to enhance the responsiveness of the various operations of the camera body 100.

(4) If the current photographic distance and the current focal length do not agree exactly with any of the discrete photographic distances and/or focal lengths that are parameters of the vignetting information tables 530 that are provided, then it is arranged for the lens side control unit 203 to acquire values for vignetting for the current photographic distance and the current focal length by referring to the vignetting information tables 530 and performing appropriate linear interpolation. Due to this, it is possible to keep down the storage capacity of the ROM 215 that is required.

(5) The lens position detection unit 213 detects the position of the focusing lens 210d and outputs a lens position signal. And the lens side transmission and reception unit 217 transmits this lens position signal that is outputted by the lens position detection unit 213 repeatedly to the camera body 100 via the first transmission path 310. On the other hand, the information relating to the closest range focused position, to the close-up end limit position, to the infinity end limit position, and to the optical characteristics of the imaging optical system 210 is transmitted to the camera body 100 via the second transmission path 320, that is different from the first transmission path 310. Since this is done, the transmission of the lens position signal is not hindered in any way by the transmission of the information related to the optical characteristics of the imaging optical system and so on.

(6) The body side control unit 103 requests transmission of the lens position signal, not by transmitting data specifying a transmission request for the lens position signal to the lens side control unit 203, but simply by changing the signal level of a specific signal line. Since this is done, accordingly this request for transmission of the lens position signal does not engender any superfluous communication.

(7) During exposure calculation at the time of photography, the body side control unit 103 is adapted to perform correction processing for obtaining an adequate exposure value by referring to the three values of vignetting for the three image heights (2/6)Y, (4/6)Y, and (6/6)Y, among the values of vignetting stored in the RAM 119. Moreover, the body side control unit 103 is adapted to perform processing for vignetting correction upon the image that has been acquired by image capture by referring to the five values of vignetting for the five image heights (2/6)Y, (3/6)Y, (4/6)Y, (5/6)Y, and (6/6)Y stored in the RAM 119. Since, due to this, common values of vignetting are employed both in the exposure calculation and in the image processing, accordingly it is possible to reduce the amount of data received from the lens barrel 200, and it is thus possible to reduce the burden upon the body side control unit 103 during exposure calculation and during image processing. Moreover, since it becomes possible to perform necessary and sufficient vignetting correction processing both during the exposure calculation before photography and also during the image processing after the image has been acquired, accordingly it is possible to enhance the quality of the image that has been obtained by image capture.

(8) The lens side transmission and reception unit 217 transmits the lens position signal repeatedly at a higher frequency than the frequency at which the closest range focused position and so on are transmitted. Since this is done, the responsiveness of automatic focus adjustment is enhanced.

<Variant Embodiments>

(1) While, in the explanation detailed above, it was arranged for the information related to vignetting to be stored in the ROM 215 as a vignetting information table like the one shown in FIG. 6, this is not to be considered as being limitative of the present invention. For example, it would also be acceptable to arrange for information for vignetting in terms of various image heights and various aperture values to be stored in the ROM 215 as calculation equations that take as input parameters the focal length and the photographic distance. And the values of vignetting would be calculated by inputting the current focal length and the current photographic distance to these calculation equations.

(2) The present invention as described above is not to be considered as being limited to photography of a still image, it could also be applied to photography of a video movie image.

(3) The above described embodiment and variant embodiments could also be combined in any of various ways.

It should be understood that the present invention is not to be considered as being limited to the embodiments described above: it includes an interchangeable lens having various types of structure, provided that it is an interchangeable lens that can be fitted to and removed from a camera body, including: an optical characteristic storage unit that stores information relating to optical characteristics of the interchangeable lens, including at least information related to vignetting of the interchangeable lens; and an optical characteristic transmission unit that transmits to the camera body the information relating to optical characteristics stored in the optical characteristic storage unit; wherein, with an image height corresponding to one sixth of the image height from the center of the approximately rectangular photographic field to any of the four corners of the photographic field being termed Y1, the optical characteristic storage unit stores, as the information related to vignetting of the interchangeable lens, information specifying vignetting at positions for which the image heights from the center are integral multiples of Y1 from 2 through 6 inclusive.

Moreover, the present invention is not to be considered as being limited to the embodiments described above: it includes a camera body having various types of structure, provided that it is a camera body to which can be removably fitted an interchangeable lens that holds information relating to optical characteristics including at least information related to vignetting, including: an exposure calculation unit that performs exposure calculation so that an adequate exposure is obtained according to the brightness of a photographic subject; an image processing unit that performs image processing upon image data obtained by image capture; and an optical characteristic information reception unit that receives from the interchangeable lens at least, as information related to vignetting of the interchangeable lens among the information relating to optical characteristics, with an image height corresponding to one sixth of the image height from the center of the approximately rectangular photographic field to any of the four corners of the photographic field being termed Y1, information related to vignetting at positions for which the image heights from the center are integral multiples of Y1 from 2 through 6 inclusive; and wherein: the exposure calculation unit performs exposure calculation so as to obtain an adequate exposure according to the brightness of a photographic subject by referring to information related to vignetting, among the information relating to optical characteristics received by the optical characteristic information reception unit, at positions where the image heights from the center are even integral multiples of Y1 between 2 and 6 inclusive; and the image processing unit performs image processing on the image data by referring to information related to vignetting, among the information relating to optical characteristics received by the optical characteristic information reception unit, at the positions where the image heights from the center are integral multiples of Y1 between 2 and 6 inclusive.

Moreover, the present invention is not to be considered as being limited to the embodiments described above: it includes a camera system having various types of structure, provided that it is a camera system including a camera body and an interchangeable lens that can be fitted to and removed from the camera body, wherein: the interchangeable lens includes an optical characteristic storage unit that stores information relating to optical characteristics of the interchangeable lens, including at least information related to vignetting of the interchangeable lens, and an optical characteristic transmission unit that transmits to the camera body the information relating to optical characteristics stored in the optical characteristic storage unit; and, with an image height corresponding to one sixth of the image height from the center of the approximately rectangular photographic field to any of the four corners of the photographic field being termed Y1, the optical characteristic storage unit stores, as the information related to vignetting of the interchangeable lens, information specifying vignetting at positions for which the image heights from the center are integral multiples of Y1 from 2 through 6 inclusive; and the camera body includes an exposure calculation unit that performs exposure calculation so that an adequate exposure is obtained according to the brightness of a photographic subject, an image processing unit that performs image processing upon image data obtained by image capture; and an optical characteristic information reception unit that receives from the optical characteristic transmission unit at least information related to vignetting of the interchangeable lens, among the information relating to optical characteristics; the exposure calculation unit performs exposure calculation so as to obtain an adequate exposure according to the brightness of a photographic subject by referring to information related to vignetting, among the information relating to optical characteristics received by the optical characteristic information reception unit, at positions where the image heights from the center are even integral multiples of Y1 between 2 and 6 inclusive; and the image processing unit performs image processing on the image data by referring to information related to vignetting, among the information relating to optical characteristics received by the optical characteristic information reception unit, at the positions where the image heights from the center are integral multiples of Y1 between 2 and 6 inclusive.

The above described embodiments are examples, and various modifications can be made without departing from the scope of the invention.

What is claimed is:

1. An interchangeable lens that can be fitted to and removed from a camera body, the interchangeable lens comprising:
    an imaging optical system that includes a focusing lens;
    a lens position detection unit that detects a position of the focusing lens, and outputs a lens position signal;
    a lens position signal transmission unit that transmits the lens position signal outputted from the lens position detection unit to the camera body;
    an optical characteristic transmission unit that transmits to the camera body information relating to optical characteristics of the interchangeable lens, including at least information related to vignetting of the interchangeable lens;

a transmission control unit that controls the lens position signal transmission unit and the optical characteristic transmission unit;

a change detection unit that detects change of a signal level of a signal line for starting communication of the camera body; and a command data reception unit that receives predetermined data transmitted from the camera body and specifying various types of command, wherein with an image height corresponding to one sixth of an image height from a center of an approximately rectangular photographic field to any of four corners of the photographic field being termed Y1, the optical characteristic transmission unit transmits, as the at least information related to vignetting of the interchangeable lens, information specifying vignetting at positions for which image heights from the center are integral multiples of Y1 from 2 through 6 inclusive, the lens position signal transmission unit transmits the lens position signal outputted from the lens position detection unit to the camera body via a first transmission path, the optical characteristic transmission unit transmits the information relating to the optical characteristics to the camera body via a second transmission path that is different from the first transmission path, when the change of the signal level of the signal line for starting communication is detected by the change detection unit, the transmission control unit controls the lens position signal transmission unit so as to transmit the lens position signal outputted from the lens position detection unit to the camera body via the first transmission path, and upon receipt of predetermined data commanding transmission of the information specifying vignetting by the command data reception unit, the transmission control unit controls the optical characteristic transmission unit to transmit the information specifying vignetting to the camera body via the second transmission path.

2. The interchangeable lens according to claim 1, further comprising:

an optical characteristic storage unit that stores as the at least information related to vignetting of the interchangeable lens, the information specifying vignetting at the positions for which the image heights from the center are the integral multiples of Y1 from 2 through 6 inclusive, wherein:

the optical characteristic storage unit stores the information specifying vignetting at positions for which the image heights from the center are integral multiples of Y1 from 2 through 6 inclusive, for each of values of aperture, focal length, and photographic distance of the interchangeable lens; and the optical characteristic transmission unit transmits to the camera body the information specifying vignetting at positions for which the image heights from the center are integral multiples of Y1 from 2 through 6 inclusive, corresponding to a current value of aperture, a current value of focal length, and a current value of photographic distance of the interchangeable lens.

3. The interchangeable lens according to claim 2, wherein:

the optical characteristic storage unit stores the information specifying vignetting discretely for each of the values of aperture, focal length, and photographic distance of the interchangeable lens; and the interchangeable lens further comprises an interpolation unit that, if the information specifying vignetting corresponding to the current value of aperture, the current value of focal length, and the current value of photographic distance of the interchangeable lens is not stored in the optical characteristic storage unit, calculates the information specifying vignetting corresponding to the current value of aperture, the current value of focal length, and the current value of photographic distance of the interchangeable lens by linear interpolation based upon the information specifying vignetting stored by the optical characteristic storage unit, and the current value of aperture, the current value of focal length, and the current value of photographic distance of the interchangeable lens.

4. The interchangeable lens according to claim 1, wherein:

the command data reception unit receives the various types of commands according to an image output cycle of an image sensor provided to the camera body; and the transmission control unit transmits the information specifying vignetting to the camera body on a cycle corresponding to the image output cycle.

5. A camera body to which can be removably fitted an interchangeable lens that holds information relating to optical characteristics including at least information related to vignetting, the camera body comprising:

an exposure calculation unit that performs exposure calculation so that an adequate exposure is obtained according to a brightness of a photographic subject;

an image processing unit that performs image processing upon image data obtained by image capture;

a lens position signal reception unit that receives from the interchangeable lens a lens position signal that is a signal related to a position of a focusing lens included in the interchangeable lens;

an optical characteristic information reception unit that receives from the interchangeable lens at least, as information related to vignetting of the interchangeable lens among the information relating to optical characteristics, with an image height corresponding to one sixth of an image height from a center of an approximately rectangular photographic field to any of four corners of the photographic field being termed Y1, information related to vignetting at positions for which image heights from the center are integral multiples of Y1 from 2 through 6 inclusive; and a transmission control unit that controls the lens position signal reception unit and the optical characteristic information reception unit, wherein:

the exposure calculation unit performs the exposure calculation so as to obtain the adequate exposure according to the brightness of the photographic subject by referring to the information related to vignetting, among the information relating to optical characteristics received by the optical characteristic information reception unit, at positions where image heights from the center are even integral multiples of Y1 between 2 and 6 inclusive, the image processing unit performs the image processing on the image data by referring to the information related to vignetting, among the information relating to optical characteristics received by the optical characteristic information reception unit, at the positions where the image heights from the center are integral multiples of Y1 between 2 and 6 inclusive, the lens position signal reception unit receives the lens position signal outputted from the interchangeable lens via a first transmission path, the optical characteristic information reception unit receives the information relating to the optical characteristics via a second transmission path that is different from the first transmission path, the transmission control unit changes a signal level of a signal line to start communication with the interchangeable lens so that the lens position signal reception unit receives the lens position signal outputted from the interchangeable lens, via the first transmission path, and the transmission control unit outputs predetermined data to the interchangeable lens commanding transmission of the information specifying vignetting so that the optical characteristic information reception unit receives the information specifying vignetting from the interchangeable lens, via the second transmission path.

6. A camera system comprising:

a camera body; and an interchangeable lens that can be fitted to and removed from the camera body, wherein:

the interchangeable lens comprises (i) an imaging optical system that comprises a focusing lens, (ii) a lens position detection unit that detects a position of the focusing lens and outputs a lens position signal, (iii) a lens position signal transmission unit that transmits the lens position signal outputted from the lens position detection unit to the camera body, (iv) an optical characteristic storage unit that stores information relating to optical characteristics of the interchangeable lens, including at least information related to vignetting of the interchangeable lens, (v) an optical characteristic transmission unit that transmits to the camera body the information relating to the optical characteristics stored in the optical characteristic storage unit, (vi) a transmission control unit that controls the lens position signal transmission unit and the optical characteristic transmission unit, (vii) a change detection unit that detects change of a signal level of a signal line for starting communication of the camera body, and (viii) a command data reception unit that receives predetermined data transmitted from the camera body and specifying various types of command;

with an image height corresponding to one sixth of an image height from a center of an approximately rectangular photographic field to any of four corners of the photographic field being termed Y1, the optical characteristic storage unit stores, as the information related to vignetting of the interchangeable lens, information specifying vignetting at positions for which image heights from the center are integral multiples of Y1 from 2 through 6 inclusive;

the camera body comprises (1) an exposure calculation unit that performs exposure calculation so that an adequate exposure is obtained according to a brightness of a photographic subject, (2) an image processing unit that performs image processing upon image data obtained by image capture, (3) an optical characteristic information reception unit that receives from the optical characteristic transmission unit at least the information related to vignetting of the interchangeable lens, among the information relating to optical characteristic, and (4) a lens position signal reception unit that receives the lens position signal outputted from the lens position signal transmission unit, wherein the exposure calculation unit performs the exposure calculation so as to obtain the adequate exposure according to the brightness of the photographic subject by referring to the information related to vignetting, among the information relating to optical characteristics received by the optical characteristic information reception unit, at positions where image heights from the center are even integral multiples of Y1 between 2 and 6 inclusive, the image processing unit performs the image processing on the image data by referring to the information related to vignetting, among the information relating to optical characteristics received by the optical characteristic information reception unit, at the positions where the image heights from the center are integral multiples of Y1 between 2 and 6 inclusive, the lens position signal transmission unit transmits the lens position signal outputted from the lens position detection unit to the camera body via a lens side first transmission path, the optical characteristics transmission unit transmits the information relating to the optical characteristics to the camera body via a lens side second transmission path that is different from the lens side first transmission path, the lens position signal reception unit receives the lens position signal outputted from the lens position signal transmission unit via a body side first transmission path, the optical characteristic information reception unit receives the information relating to the optical characteristics via a body side second transmission path that is different from the body side first transmission path, when the change of the signal level of the signal line for starting communication is detected by the change detection unit, the transmission control unit controls the lens position signal transmission unit so as to transmit the lens position signal outputted from the lens position detection unit to the camera body via the lens side first transmission path, and upon receipt of predetermined data commanding transmission of the information specifying vignetting by the command data reception unit, the transmission control unit controls the optical characteristic transmission unit to transmit the information specifying vignetting to the camera body via the lens side second transmission path.

7. The interchangeable lens according to claim 1, further comprising:

an optical characteristic storage unit that stores as the at least information related to vignetting of the interchangeable lens, the information specifying vignetting at the positions for which the image heights from the center are the integral multiples of Y1 from 2 through 6 inclusive.

8. An interchangeable lens that can be fitted to and removed from a camera body, the interchangeable lens comprising:

an imaging optical system that includes a focusing lens;

a lens position detection unit that detects a position of the focusing lens, and outputs a lens position signal;

a lens position signal transmission unit that transmits the lens position signal outputted from the lens position detection unit to the camera body;

an optical characteristic transmission unit that transmits to the camera body information relating to optical characteristics of the interchangeable lens, including at least information related to vignetting of the interchangeable lens;

a transmission control unit that controls the lens position signal transmission unit and the optical characteristic transmission unit;

a change detection unit that detects change of a signal level of a signal line for starting communication of the camera body; and a command data reception unit that receives predetermined data transmitted from the camera body and specifying various types of command, wherein the lens position signal transmission unit transmits the lens position signal outputted from the lens position detection unit to the camera body via a first transmission path, the optical characteristic transmission unit transmits the information relating to the optical characteristics to the camera body via a second transmission path that is different from the first transmission path, when the change of the signal level of the signal line for starting communication is detected by the change detection unit, the transmission control unit controls the lens position signal transmission unit so as to transmit the lens position signal outputted from the lens position detection unit to the camera body via the first transmission path, and upon receipt of predetermined data commanding transmission of the information specifying vignetting by the command data reception unit, the transmission control unit controls the optical characteristic transmission unit to transmit the information specifying vignetting to the camera body via the second transmission path.

9. A camera body to which can be removably fitted an interchangeable lens that holds information relating to optical characteristics including at least information related to vignetting, the camera body comprising:

an exposure calculation unit that performs exposure calculation so that an adequate exposure is obtained according to a brightness of a photographic subject;

an image processing unit that performs image processing upon image data obtained by image capture;

a lens position signal reception unit that receives from the interchangeable lens a lens position signal that is a signal related to a position of a focusing lens included in the interchangeable lens;

an optical characteristic information reception unit that receives from the interchangeable lens at least the information related to vignetting of the interchangeable lens among the information relating to optical characteristics; and a transmission control unit that controls the lens position signal reception unit and the optical characteristic information reception unit, wherein:

the exposure calculation unit performs the exposure calculation so as to obtain the adequate exposure according to the brightness of the photographic subject by referring to the information related to vignetting, among the information relating to optical characteristics received by the optical characteristic information reception unit, the image processing unit performs the image processing on the image data by referring to the information related to vignetting, among the information relating to optical characteristics received by the optical characteristic information reception unit, the lens position signal reception unit receives the lens position signal outputted from the interchangeable lens via a first transmission path, the optical characteristic information reception unit receives the information relating to the optical characteristics via a second transmission path that is different from the first transmission path, the transmission control unit changes a signal level of a signal line to start communication with the interchangeable lens so that the lens position signal reception unit receives the lens position signal outputted from the interchangeable lens, via the first transmission path, and the transmission control unit outputs predetermined data to the interchangeable lens commanding transmission of the information specifying vignetting so that the optical characteristic information reception unit receives the information specifying vignetting from the interchangeable lens, via the second transmission path.

10. A camera system comprising:

a camera body; and an interchangeable lens that can be fitted to and removed from the camera body, wherein:

the interchangeable lens comprises (i) an imaging optical system that comprises a focusing lens, (ii) a lens position detection unit that detects a position of the focusing lens and outputs a lens position signal, (iii) a lens position signal transmission unit that transmits the lens position signal outputted from the lens position detection unit to the camera body, (iv) an optical characteristic storage unit that stores information relating to optical characteristics of the interchangeable lens, including at least information related to vignetting of the interchangeable lens, (v) an optical characteristic transmission unit that transmits to the camera body the information relating to the optical characteristics stored in the optical characteristic storage unit, (vi) a transmission control unit that controls the lens position signal transmission unit and the optical characteristic transmission unit, (vii) a change detection unit that detects change of a signal level of a signal line for starting communication of the camera body, and (viii) a command data reception unit that receives predetermined data transmitted from the camera body and specifying various types of command;

the camera body comprises (1) an exposure calculation unit that performs exposure calculation so that an adequate exposure is obtained according to a brightness of a photographic subject, (2) an image processing unit that performs image processing upon image data obtained by image capture, (3) an optical characteristic information reception unit that receives from the optical characteristic transmission unit at least the information related to vignetting of the interchangeable lens, among the information relating to optical characteristic, and (4) a lens position signal reception unit that receives the lens position signal outputted from the lens position signal transmission unit, wherein the exposure calculation unit performs the exposure calculation so as to obtain the adequate exposure according to the brightness of the photographic subject by referring to the information related to vignetting, among the information relating to optical characteristics received by the optical characteristic information reception unit, the image processing unit performs the image processing on the image data by referring to the information related to vignetting, among the information relating to optical characteristics received by the optical characteristic information reception unit, the lens position signal transmission unit transmits the lens position signal outputted from the lens position detection unit to the camera body via a lens side first transmission path, the optical characteristic transmission unit transmits the information relating to the optical characteristics to the camera body via a lens side second transmission path that is different from the lens side first transmission path, the lens position signal reception unit receives the lens position signal outputted from the lens position signal transmission unit via a body side first transmission path, the optical characteristic information reception unit receives the information relating to the optical characteristics via a body side second transmission path that is different from the body side first transmission path, when the change of the signal level of the signal line for starting communication is detected by the change detection unit, the transmission control unit controls the lens position signal transmission unit so as to transmit the lens position signal outputted from the lens position detection unit to the camera body via the lens side first transmission path, and upon receipt of predetermined data commanding transmission of the information specifying vignetting by the command data reception unit, the transmission control unit controls the optical characteristic transmission unit to transmit the information specifying vignetting to the camera body via the lens side second transmission path.

11. A camera system comprising:

a camera body; and an interchangeable lens that can be fitted to and removed from the camera body, wherein:

the interchangeable lens comprises (i) an imaging optical system that comprises a focusing lens, (ii) a lens position detection unit that detects a position of the focusing lens and outputs a lens position signal, (iii) a lens position signal transmission unit that transmits the lens position signal outputted from the lens position detection unit to the camera body, (iv) an optical characteristic storage unit that stores information relating to optical characteristics of the interchangeable lens, including at least information related to vignetting of the interchangeable lens, and (v) an optical characteristic transmission unit that transmits to the camera body the information relating to the optical characteristics stored in the optical characteristic storage unit;

the camera body comprises (1) an optical characteristic information reception unit that receives from the optical characteristic transmission unit at least the information related to vignetting of the interchangeable lens, among the information relating to optical characteristic, and (2) a lens position signal reception unit that receives the lens position signal outputted from the lens position signal transmission unit, wherein the lens position signal transmission unit transmits the lens position signal outputted from the lens position detection unit to the camera body via a lens side first transmission path, the optical characteristic transmission unit transmits the information relating to the optical characteristics to the camera body via a lens side second transmission path that is different from the lens side first transmission path, the lens position signal reception unit receives the lens position signal outputted from the lens position signal transmission unit via a body side first transmission path, and the optical characteristic information reception unit receives the information relating to the optical characteristics via a body side second transmission path that is different from the body side first transmission path.

* * * * *